(12) United States Patent
Abe et al.

(10) Patent No.: US 9,456,207 B2
(45) Date of Patent: Sep. 27, 2016

(54) PROJECTION DISPLAY APPARATUS

(71) Applicant: Panasonic Corporation, Kadoma-shi, Osaka (JP)

(72) Inventors: Takaaki Abe, Osaka (JP); Ken Mashitani, Osaka (JP); Masutaka Inoue, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 167 days.

(21) Appl. No.: 14/281,322

(22) Filed: May 19, 2014

(65) Prior Publication Data

US 2014/0340492 A1 Nov. 20, 2014

(30) Foreign Application Priority Data

May 20, 2013 (JP) .................................. 2013-105796
May 16, 2014 (JP) .................................. 2014-102070

(51) Int. Cl.
*H04N 5/74* (2006.01)
*H04N 13/04* (2006.01)
*H04N 9/31* (2006.01)

(52) U.S. Cl.
CPC ........ *H04N 13/0497* (2013.01); *H04N 9/3188* (2013.01); *H04N 13/0438* (2013.01); *H04N 13/0459* (2013.01)

(58) Field of Classification Search
CPC . H04N 5/7416; H04N 5/7441; H04N 5/7458
See application file for complete search history.

(56) References Cited

U.S. PATENT DOCUMENTS

| | | | | |
|---|---|---|---|---|
| 6,184,969 | B1* | 2/2001 | Fergason | G02B 27/017 348/E13.029 |
| 8,388,138 | B1* | 3/2013 | Boothroyd | G02B 27/26 348/51 |
| 2004/0036834 | A1* | 2/2004 | Ohnishi | G02F 1/133382 349/177 |
| 2005/0105016 | A1* | 5/2005 | Kurihara | H04N 9/3108 349/96 |
| 2006/0023003 | A1* | 2/2006 | Yamanaka | G09G 3/007 345/690 |

FOREIGN PATENT DOCUMENTS

| | | |
|---|---|---|
| JP | H04-113308 | 4/1992 |
| JP | 2006-47414 | 2/2006 |
| JP | 2006-154798 | 6/2006 |

* cited by examiner

*Primary Examiner* — Andy Rao
*Assistant Examiner* — Tyler Edwards
(74) *Attorney, Agent, or Firm* — Hamre, Schumann, Mueller & Larson, P.C.

(57) ABSTRACT

A projection display apparatus includes an image generation unit that generates an image light, an optical system that projects the image light onto a projection plane, an optical path changing unit that changes a display position of the image light on the projection plane, and a controller. The controller generates signals for plural types of sub-frames by dividing spatially a signal for each frame of the video input signal. The controller controls the optical path changing unit to keep the display position of the image light on the projection plane before and after transition of the frame of the video signal, and controls the image generation unit to make a type of a beginning sub-frame in a frame output just after the transition equal to a type of a last sub-frame in a frame output just before the transition.

7 Claims, 22 Drawing Sheets

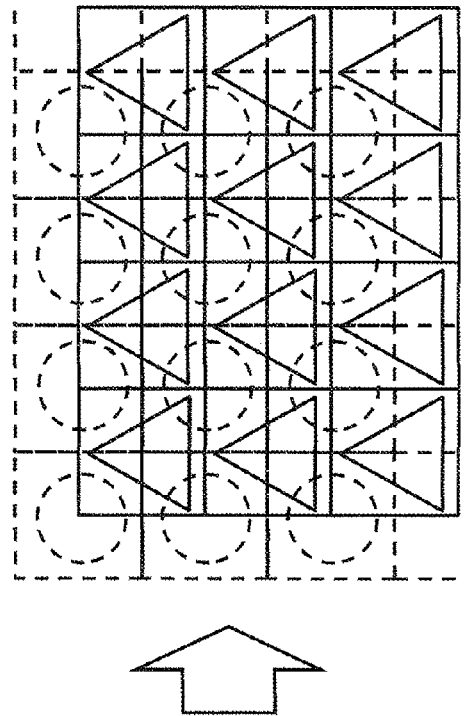
Fig. 9C
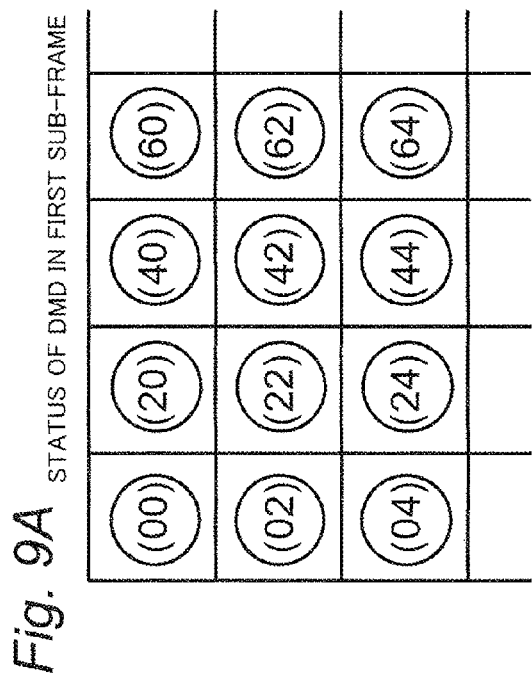
Fig. 9A STATUS OF DMD IN FIRST SUB-FRAME
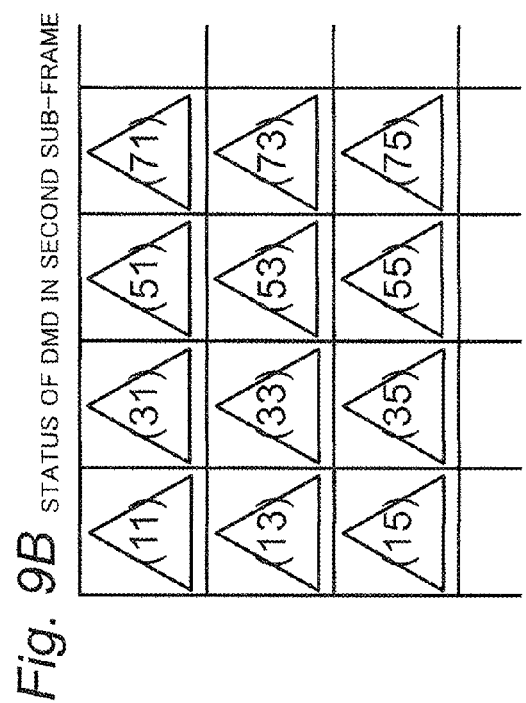
Fig. 9B STATUS OF DMD IN SECOND SUB-FRAME

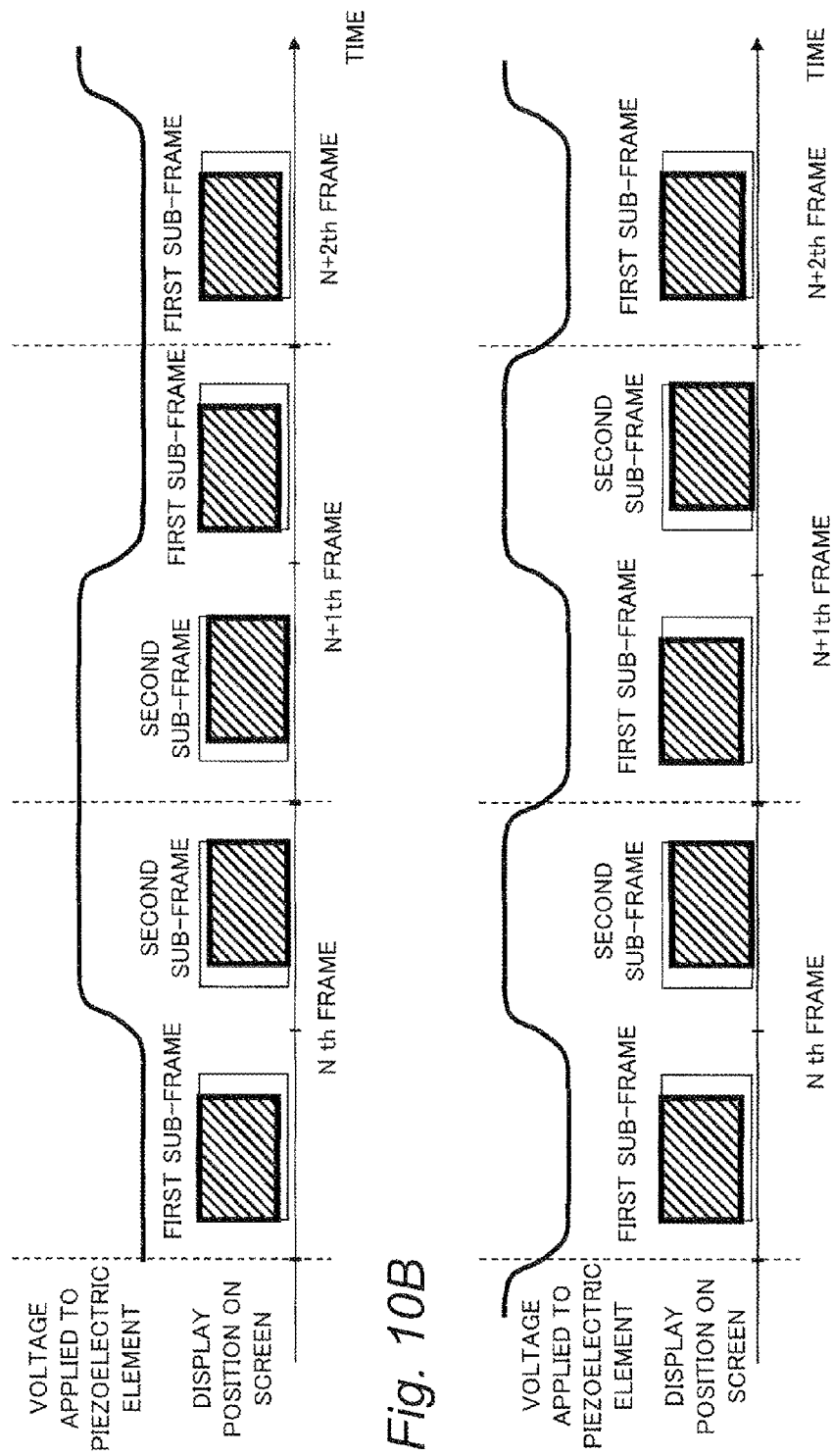

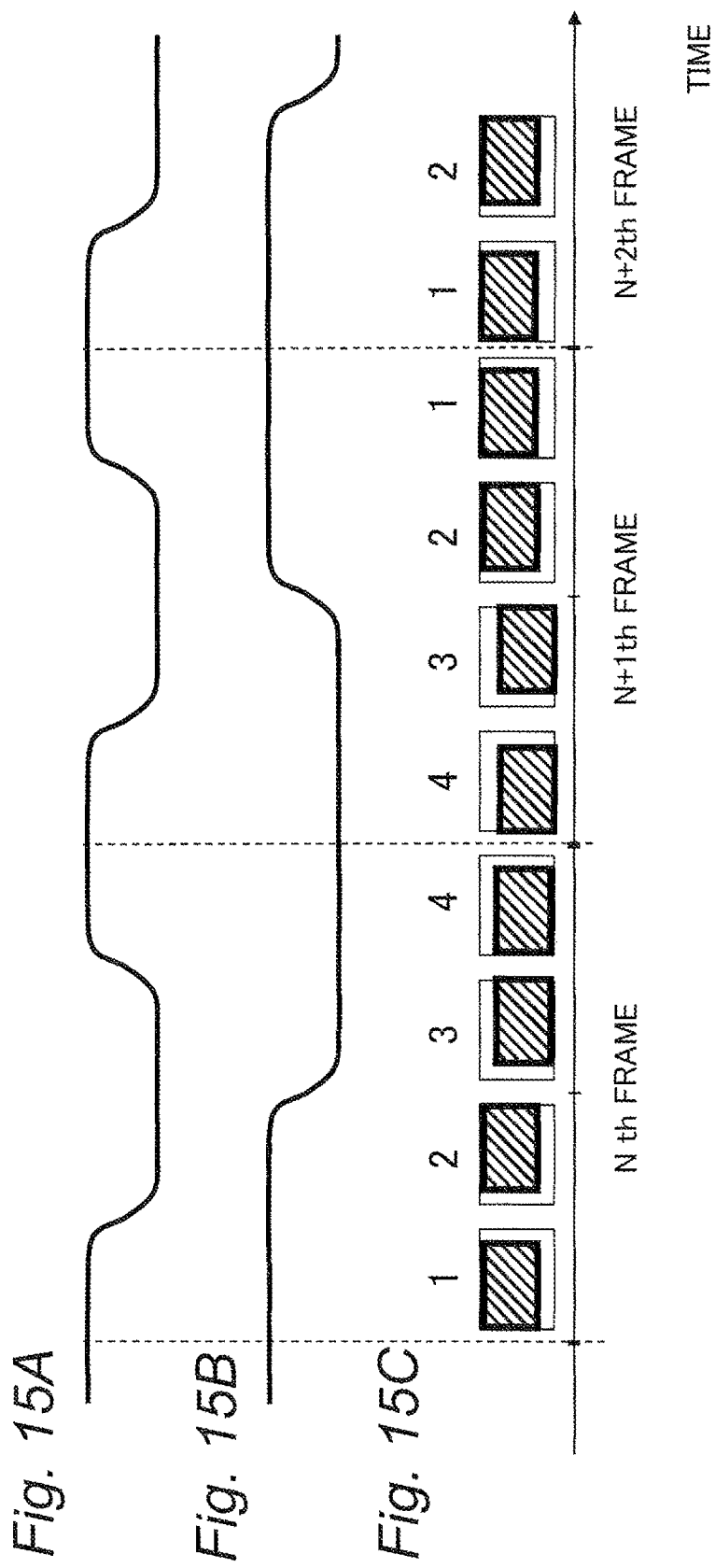

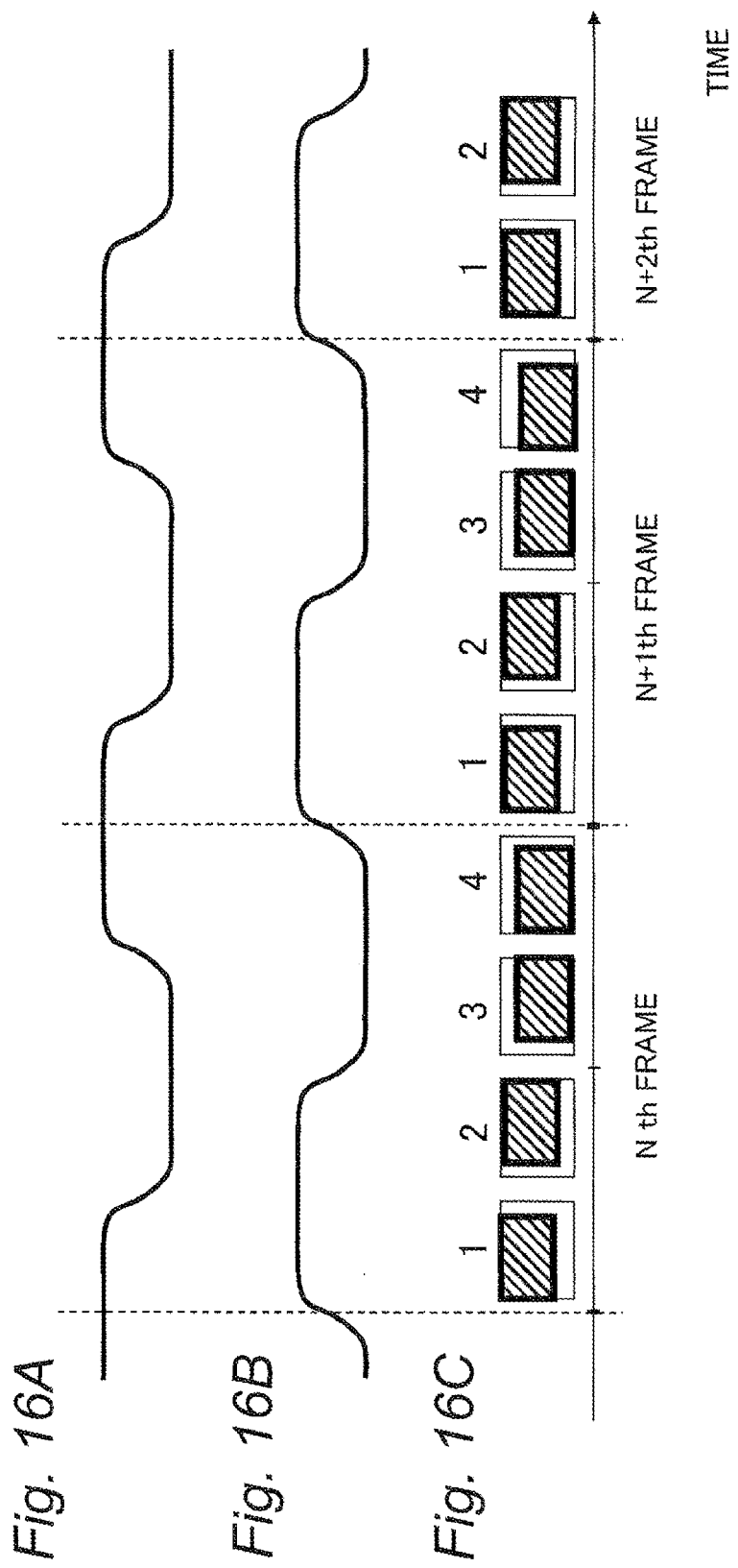

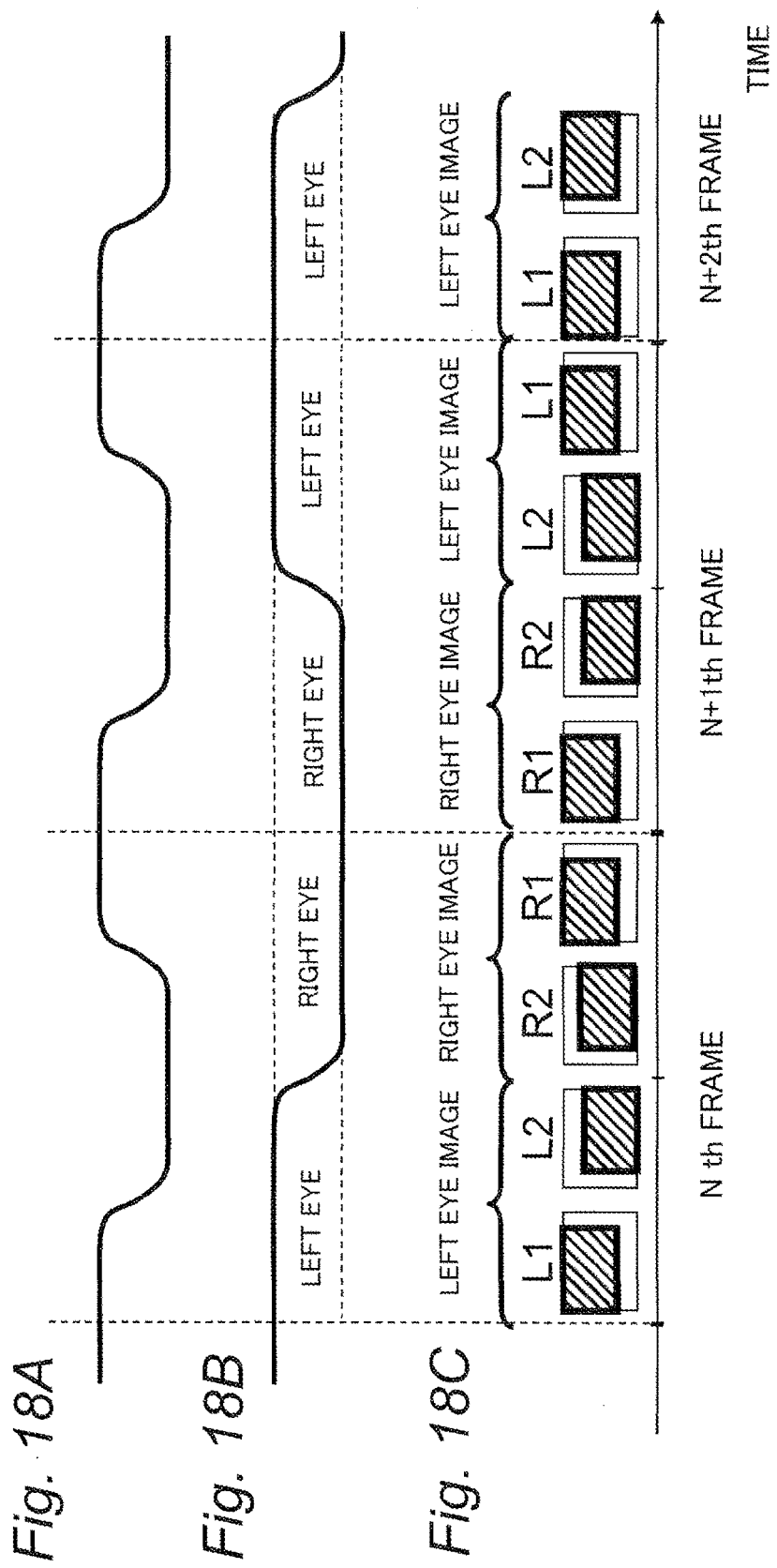

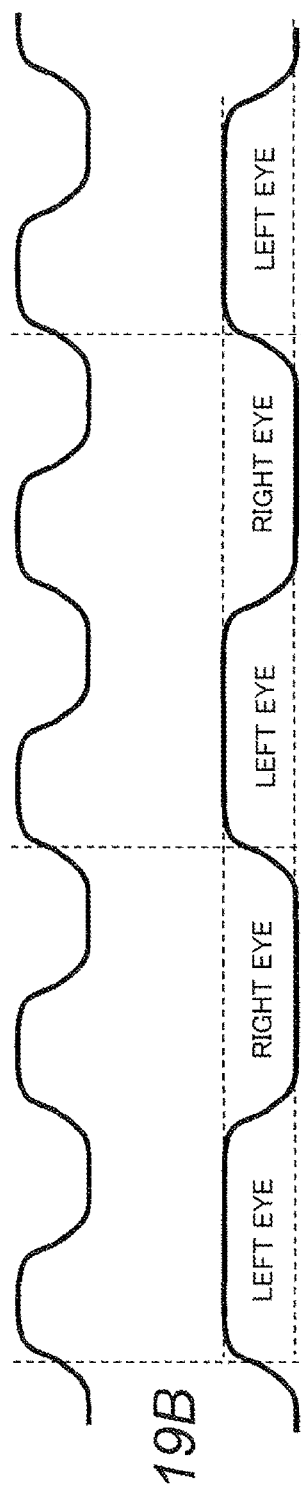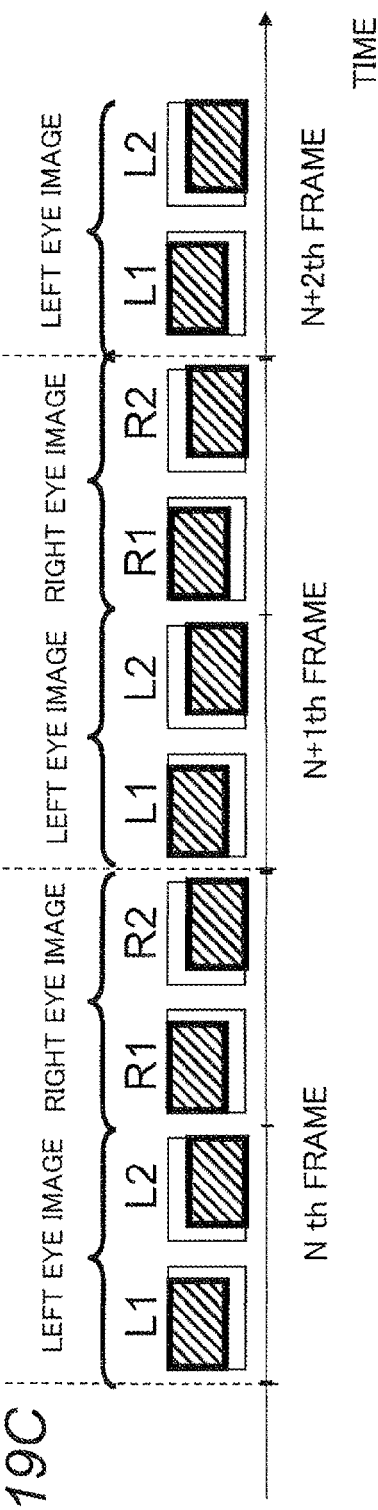

PROJECTION DISPLAY APPARATUS

BACKGROUND

1. Technical Field

The present disclosure relates to a projection display apparatus which can project an image by shifting an optical path of an image light in a predetermined cycle.

2. Related Art

There have been known projection display apparatuses provided with a so-called wobbling element which controls an optical path of an image light generated by an image generation unit such as an liquid crystal display element to change a display position of the image light on a projection plane for the purpose of achieving a high-resolution, high-quality video.

With the wobbling element, the projection display apparatus can present a high-resolution image even in the case where a video input signal with a higher resolution than that of the image generation unit is input (for example, refer to JP 2006-047414 A).

The conventional projection display apparatus sequentially displays sub-frames of images in synchronization with changes of the optical path of the image light. For that purpose, each time the projection display apparatus switches the sub-frame image, it drives the wobbling element to change the display position of the image light on the projection plane. However, when the wobbling element is driven at high-speed, the image is blurred due to the switching of the images during the changing of the display position, resulting in degradation of the image quality.

It is an object of the present disclosure to provide a projection display apparatus which can project a high-resolution video by shifting an optical path of an image light in a predetermined cycle, and can suppress degradation of image quality.

SUMMARY

A projection display apparatus includes an image generation unit that generates an image light, an optical system that projects the image light onto a projection plane, an optical path changing unit that is provided on an optical path of the image light and changes a display position of the image light on the projection plane, and a controller that controls the image generation unit and the optical path changing unit based on a video input signal. The controller generates signals for plural types of sub-frames by dividing spatially a signal for each frame of the video input signal. The controller controls the optical path changing unit to keep the display position of the image light on the projection plane before and after transition of the frame of the video signal. The controller further controls the image generation unit to make a type of a beginning sub-frame in a frame output just after the transition equal to a type of a last sub-frame in a frame output just before the transition.

The controller may generate a left eye image signal and a right eye image signal for stereoscopic display from the video input signal. The controller may control the image generation unit to generate an image light for a left eye image in the beginning sub-frame of the frame output just after the transition of the frame, when the image light of the last sub-frame of the frame output just before the transition of the frame is of the left eye image, and to generate an image light for a right eye image in the beginning sub-frame of the frame output just after the transition of the frame, when the image light of the last sub-frame of the frame output just before the transition of the frame is of the right eye image.

According to the present disclosure, it is possible to reduce the frequency of changing the optical path and also to display a video which gives the audience an impression of a high-resolution video while keeping the video quality.

BRIEF DESCRIPTION OF DRAWINGS

FIGS. 8A to 8C are diagrams illustrating a correspondence between pixels of a video input signal and pixels of a video output signal in a case where resolution of the video input signal is four times as high as that of display elements;

FIGS. 9A to 9C are diagrams illustrating display positions (projection positions) of a plurality of sub-frames on a screen shifted by an optical path changing unit;

FIG. 10A is a timing chart for a driving voltage for a piezoelectric element and the order of displaying sub-frames (display positions of the sub-frames on the screen), showing control according to the present disclosure;

FIG. 10B is a timing chart for a driving voltage for a piezoelectric element and the order of displaying sub-frames (display positions of the sub-frames on the screen), showing control in a comparative example;

FIGS. 13A to 13E are diagrams illustrating a correspondence between pixels of a video input signal and pixels of a video output signal in a case where resolution of the video input signal is four times as high as that of display elements according to the second embodiment;

FIGS. 14A1 to 14D2 are diagrams illustrating correspondences of display positions of a plurality of sub-frames on a screen projected through the optical path changing unit according to the second embodiment;

FIGS. 15A to 15C show (a) a timing chart for a driving voltage for a piezoelectric element to shift a lens in the X direction, (b) a driving voltage for a piezoelectric element to shift the lens in the Y direction, and (c) the order of displaying sub-frames (and display positions of the sub-frames on the screen) according to the second embodiment, respectively;

FIGS. 16A to 16C show a timing chart for (a) a driving voltage for a piezoelectric element to shift a lens in the X direction, (b) a driving voltage for a piezoelectric element to shift the lens in the Y direction, and (c) the order of displaying sub-frames (and display positions of the sub-frames on the screen) in a comparative example of the second embodiment, respectively;

FIGS. 18A to 18C show a timing chart for (a) a driving voltage for a piezoelectric element, (b) a switching signal for liquid crystal shutters, and (c) the order of displaying sub-frames (and display positions of the sub-frames on the screen) according to the third embodiment, respectively;

FIGS. 19A to 19C show a timing chart for (a) a driving voltage for a piezoelectric element, (b) a switching signal for liquid crystal shutters, and (c) the order of displaying sub-frames (and display positions of the sub-frames on the screen) in a comparative example of the third embodiment, respectively;

DETAILED DESCRIPTION OF PREFERRED EMBODIMENTS

Embodiments will be described below in detail with reference to the drawings as required. However, unnecessarily detailed description may be omitted. For example, detailed description of an already known matter and repetition of substantially the same configuration may be omitted. All of such omissions are for preventing unnecessary redundancy in the following description to facilitate understanding by those skilled in the art.

The applicant provides the attached drawings and the following description for those skilled in the art to fully understand the present disclosure and does not intend to limit the subject matter described in the claims by the attached drawings and the following description.

First Embodiment

1. Configuration of the Projection Display Apparatus

Figure 1:
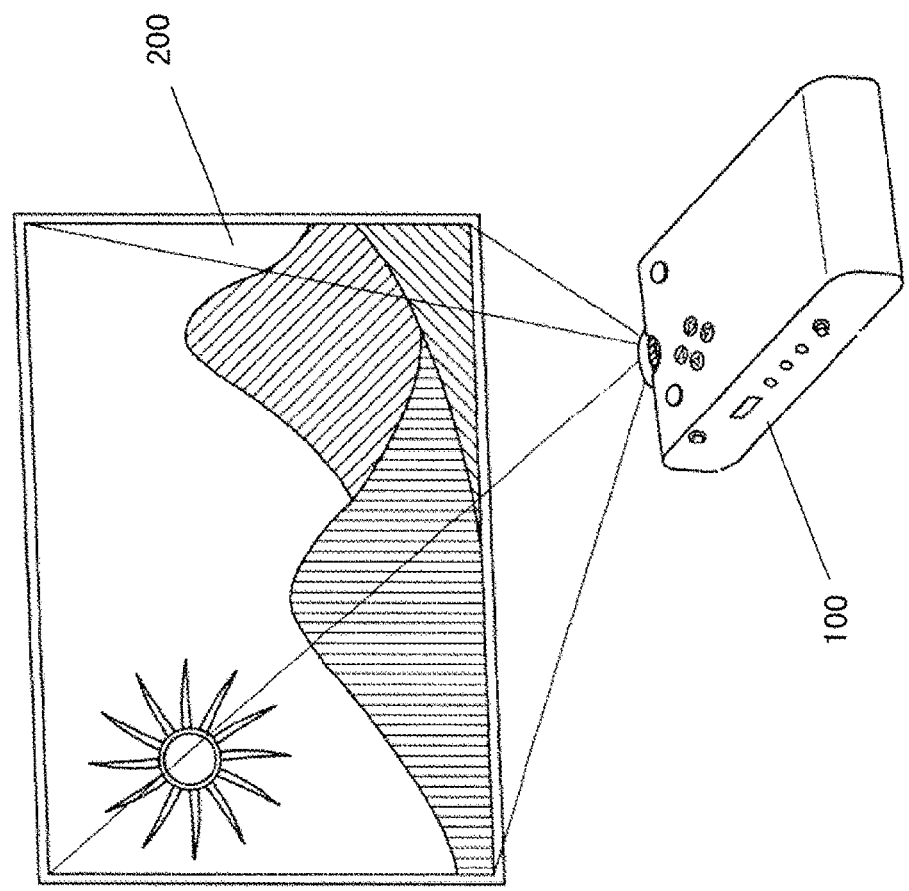
FIG. 1 is a perspective view of a projection display apparatus according to the present disclosure.

A configuration of the projection display apparatus will be described with reference to FIGS. 1 and 2. FIG. 1 is an external perspective view of a projection display apparatus 100. As illustrated in FIG. 1, the projection display apparatus 100 projects an image light generated in accordance with a video input signal onto a screen (projection plane) 200.

Figure 2:
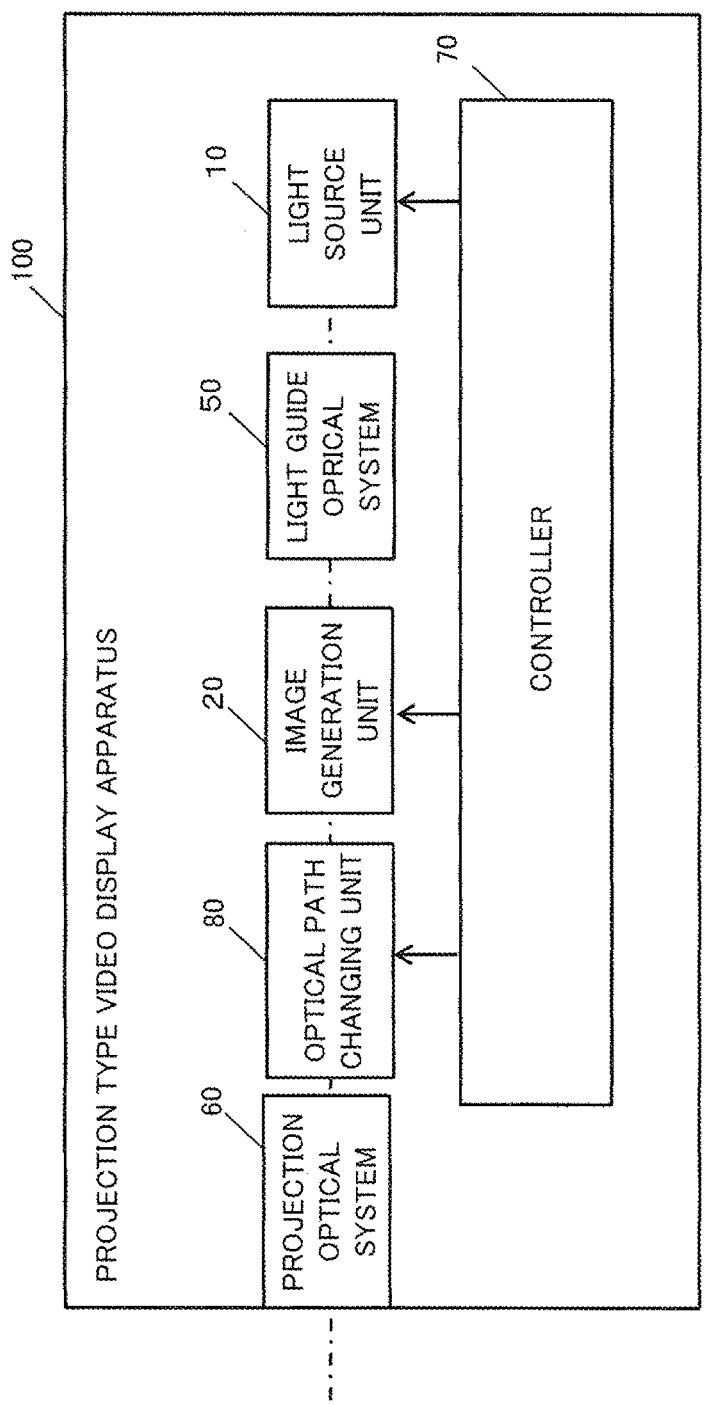
FIG. 2 is a block diagram illustrating a configuration of the projection display apparatus according to the present disclosure.

FIG. 2 is a block diagram illustrating a configuration of the projection display apparatus 100. The projection display apparatus 100 includes a light source unit 10, an image generation unit 20 which generates an image light in accordance with a video input signal, a light guide optical system 50 which guides light from the light source unit 10 to the image generation unit 20, a projection optical system 60 which projects the generated image light onto a screen 200, and a controller 70 which controls the light source unit 10, the image generation unit 20, and so on.

The projection display apparatus 100 further includes an optical path changing unit 80 for changing an optical path of the image light generated by the image generation unit 20. Specifically, the optical path changing unit 80 slides a display position on the screen 200 of the image light generated by the image generation unit 20 within a range of pixel pitch (for example, ½ pixel) (this operation will be detailed later). With that configuration, the projection display apparatus 100 can present an image with a high-resolution.

1.1 Optical Configuration of Projection Display Apparatus

Figure 3:
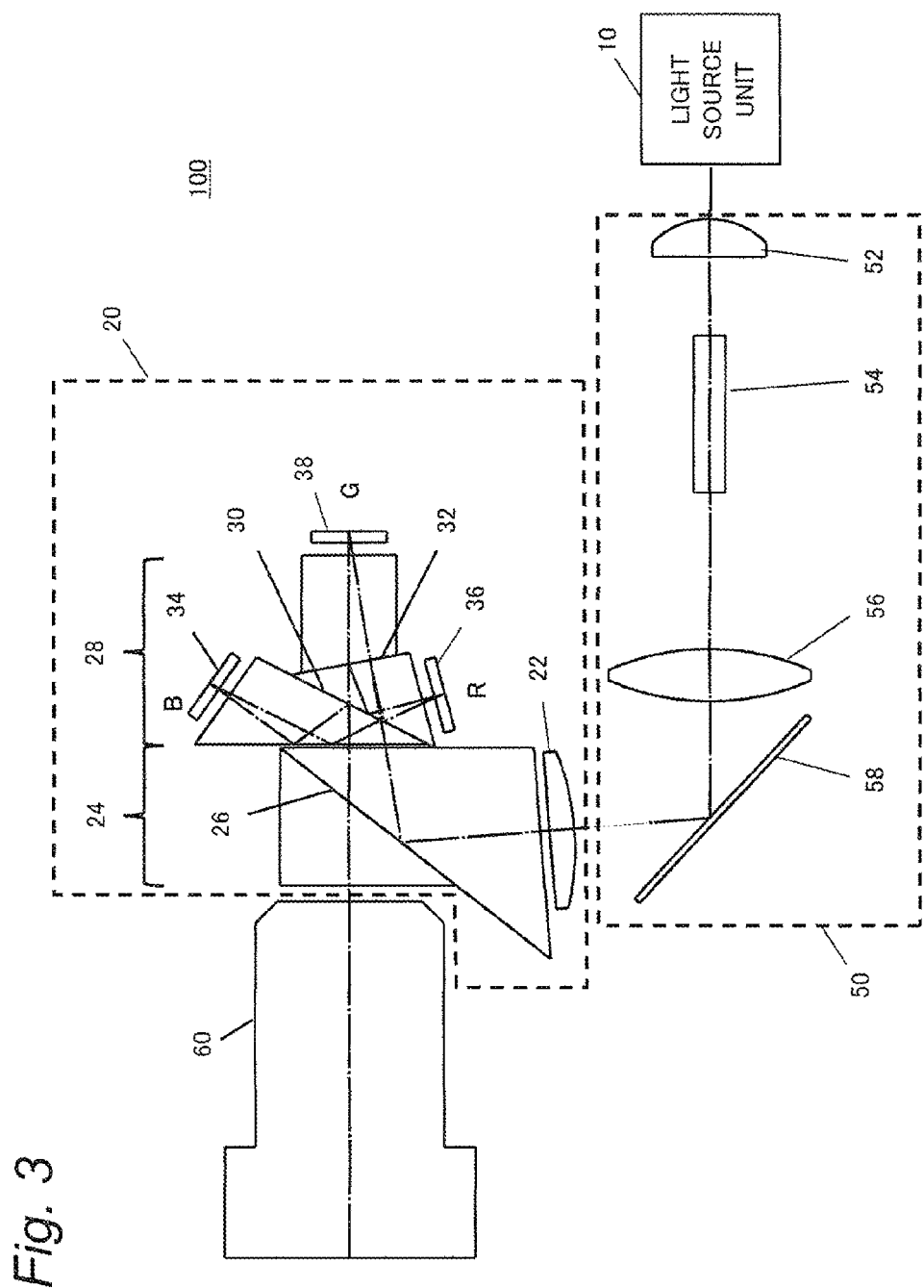
FIG. 3 is a diagram illustrating an optical configuration of the projection display apparatus according to the present disclosure.

An optical configuration of the projection display apparatus 100 will be described with reference to FIG. 3. FIG. 3 is a schematic diagram illustrating an optical configuration of the projection display apparatus 100.

White light exited from the light source unit 10 enters the light guide optical system 50. The light entering the light guide optical system 50 first enters a lens 52 to be collected to an incidence plane of a rod 54. The light entering the rod 54 is reflected inside the rod 54 for a plurality of times to exit from the rod 54 as a light with a substantially uniform light intensity distribution. The light exiting from the rod 54 is collected by a lens 56. The lens 56 is a relay lens for imaging an image of an exit plane of the rod 54 on a DMD (Digital Mirror Device) (described later). The light exiting from the lens 56 is reflected on a mirror 58 to enter the image generation unit 20.

The light entering the image generation unit 20 enters a total reflection prism 24 through a lens 22. The lens 22 is a lens for condensing the incident light to substantially collimate the light.

The total reflection prism 24 is made of two prisms with a thin air space 26 interposed between adjacent surfaces of the prisms. The air space 26 fully reflects the incident light having an incident angle equal to or greater than the critical angle. The light entering the total reflection prism 24 through the lens 22 is reflected at the air space 26 (total reflection plane) and enters a color prism 28.

The color prism 28 is made of three prisms with a blue-reflecting dichroic film 30 and a red-reflecting dichroic film 32 being formed on adjacent surfaces of the respective prisms. The light entering the color prism 28 is split into blue, red, and green lights by the blue-reflecting dichroic film 30 and the red-reflecting dichroic film 32, and then, the lights enter the DMDs 34, 36, and 38, respectively. The DMDs 34, 36, and 38 change the reflection directions of the incident light rays by deflecting micro-mirrors according to the video input signal to guide the light into a projection lens contained in the projection optical system 60 or to guide the light in an area outside an effective area of the projection lens.

The light reflected from the DMDs 34, 36, and 38 transmit the color prism 28 again. The respective split color lights of blue, red, and green are combined while they transmit through the color prism 28, then enter the total reflection prism 24. Since the light enters the total reflection prism 24 at an angle equal to or less than the critical angle, it transmits the total reflection prism 24 and enters the projection optical system 60. As a result, the image light formed by the DMDs 34, 36, and 38 is projected on the screen.

Since the DMDs 34, 36, and 38 are used as a display element, the projection display apparatus can be more light-resistant and heat-resistant compared to an projection display apparatus using the liquid crystal display device (liquid crystal panel). Further, the three DMDs are used for the respective colors of blue, red, and green, and thus the projection display apparatus can produce a bright and high-definition projection video with excellent color reproduction.

1.2 Configuration of Optical Path Changing Unit

Figure 4:
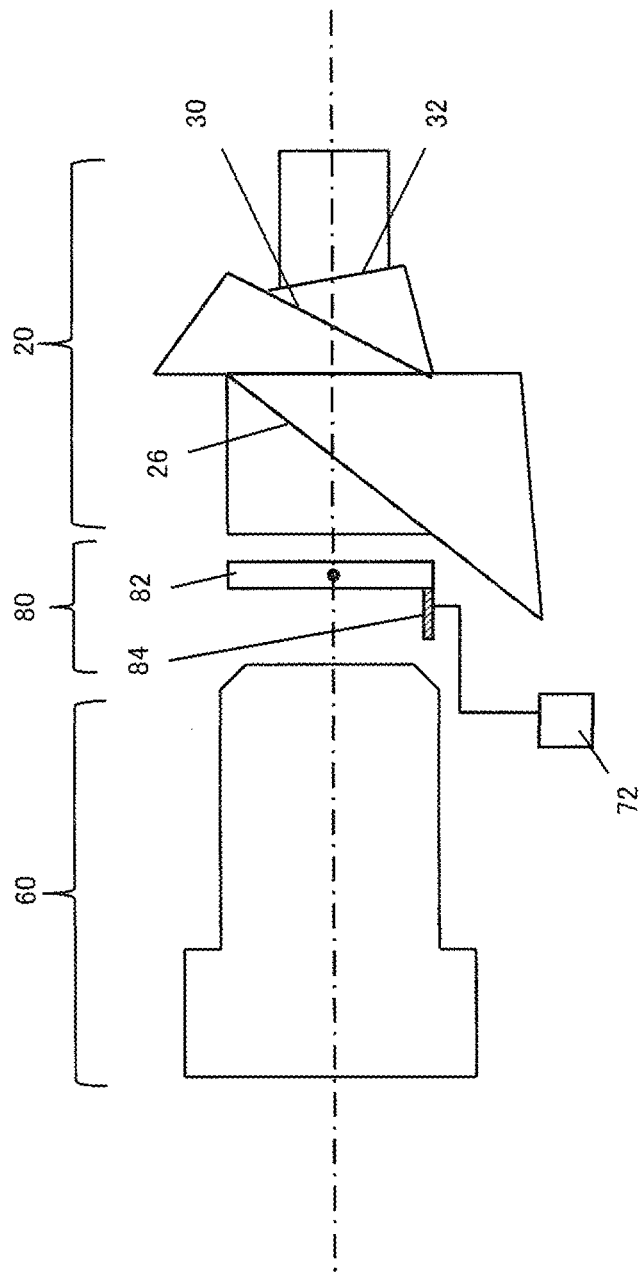
FIG. 4 is a diagram illustrating an optical configuration from an image generation unit to a projection optical system of a projection display apparatus according to a first embodiment.

A configuration of the optical path changing unit 80 will be described with reference to FIG. 4. FIG. 4 is a schematic diagram illustrating an optical configuration from the image generation unit 20 to the projection optical system 60.

The optical path changing unit 80 includes a glass member 82 for refracting the optical path of the image light from the image generation unit 20 by making use of change in the refractive index, and a piezoelectric element 84 for changing an angle of the glass member 82. The piezoelectric element 84 is connected to a piezoelectric element driver 72 which controls the piezoelectric element 84 to expand or contract by supplying power to the piezoelectric element 84. The glass member 82 is pivotable around a shaft orthogonal to the optical axis of the image light so that its arranged angle can be changed.

The piezoelectric element 84 can expand to come into contact with the glass member 82 when applied a predetermined voltage. Under the pressing of the piezoelectric element 84, the angle of the glass member 82 on the shaft orthogonal to the optical axis of the image light changes, and accordingly the incidence angle of the image light to the glass member 82 changes. Then, the image light travels into a slightly different direction, and therefore the display position of the image light on the screen 200 moves.

2. Operation of Projection Display Apparatus

The projection display apparatus 100 has a normal mode and a high-resolution mode in which the projection display apparatus 100 projects a higher-resolution image than in the normal mode, as a video projection mode. In the normal mode, the projection display apparatus 100 projects an image with the same resolution as that of the DMDs 34, 36, and 38.

2.1 Operation of Optical Path Changing Unit

Figure 5:
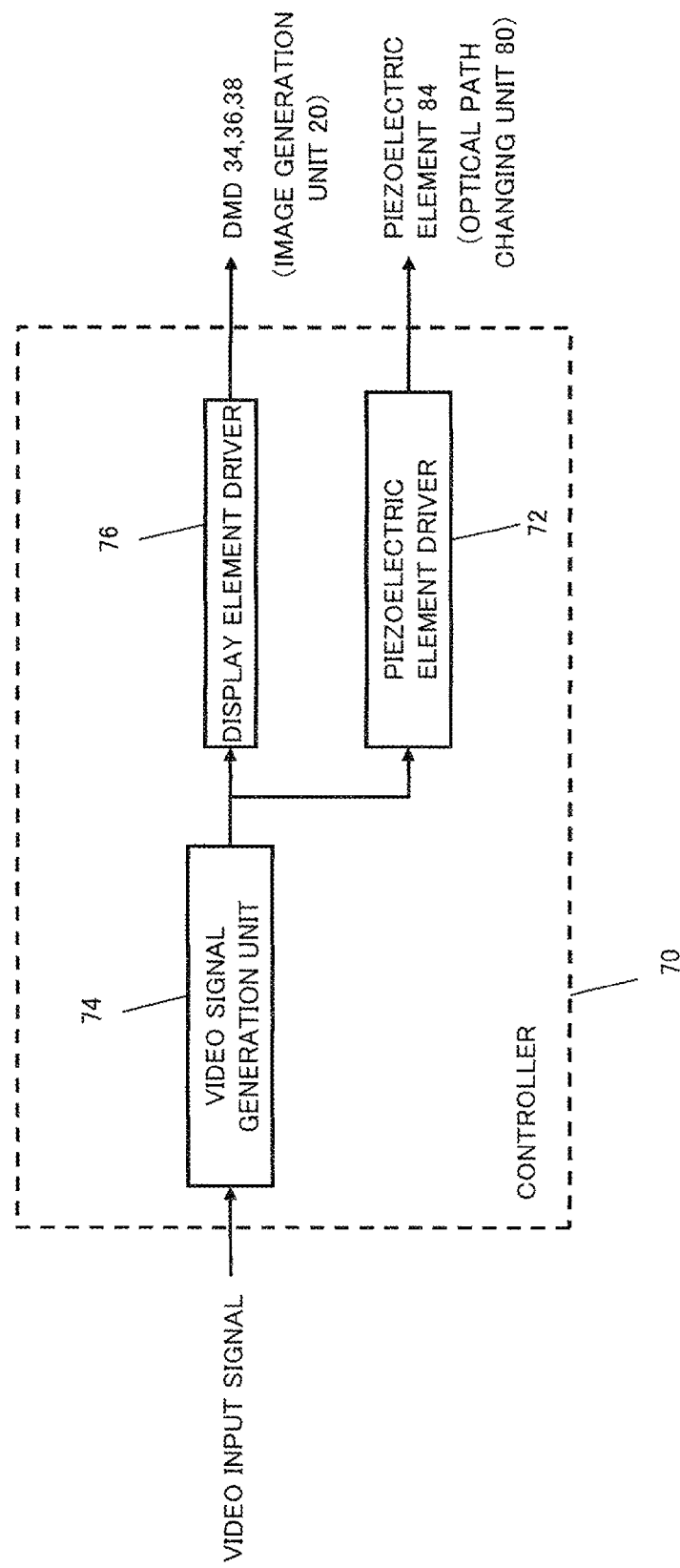
FIG. 5 is a block diagram illustrating a configuration of a controller of the projection display apparatus.

Control of the controller 70 of the projection display apparatus 100 will be described with reference to FIGS. 5 to 10. FIG. 5 is a block diagram illustrating a configuration of the controller 70. The controller 70 includes a video signal generation unit 74, a display element driver 76, and the piezoelectric element driver 72.

2.1.1 Operation in the Normal Mode

The video signal generation unit 74 converts a video input signal input to the controller 70 into a video output signal to be output to the DMDs 34, 36, and 38. Further, the video signal generation unit 74 converts the video input signal into a synchronizing signal which is used for synchronizing the image light generated by the DMDs 34, 36, and 38 with driving operation of the piezoelectric element 84. That is, the video signal generation unit 74 generates the video output signal and the synchronizing signal based on the video input signal.

Figure 6:
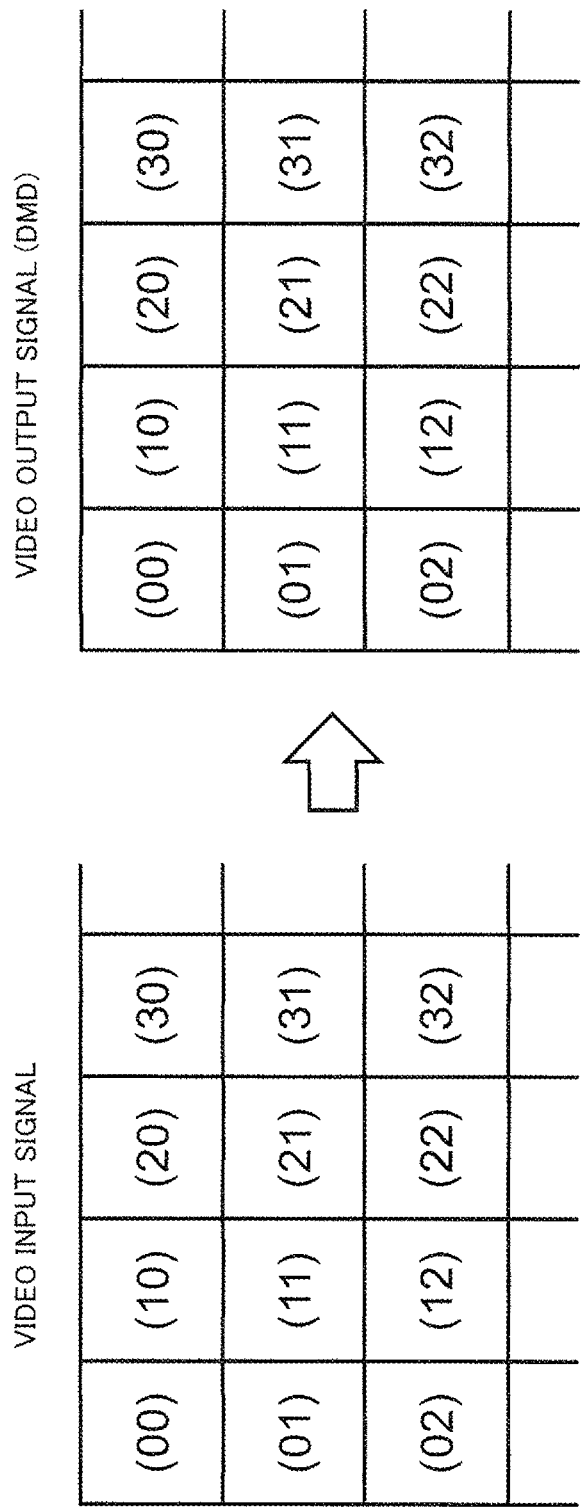
FIG. 6 is a diagram illustrating a correspondence between pixels of a video input signal and pixels of a video output signal in a case where resolution of the video input signal is the same as that of display elements.

When inputting the video input signal with the same resolution as that of the DMDs 34, 36, and 38, the video signal generation unit 74 outputs the video input signal having pixel values same as those of the corresponding pixels of the DMDs 34, 36, and 38, as it is, as the video output signal to the display element driver 76, as illustrated in FIG. 6.

Figure 7:
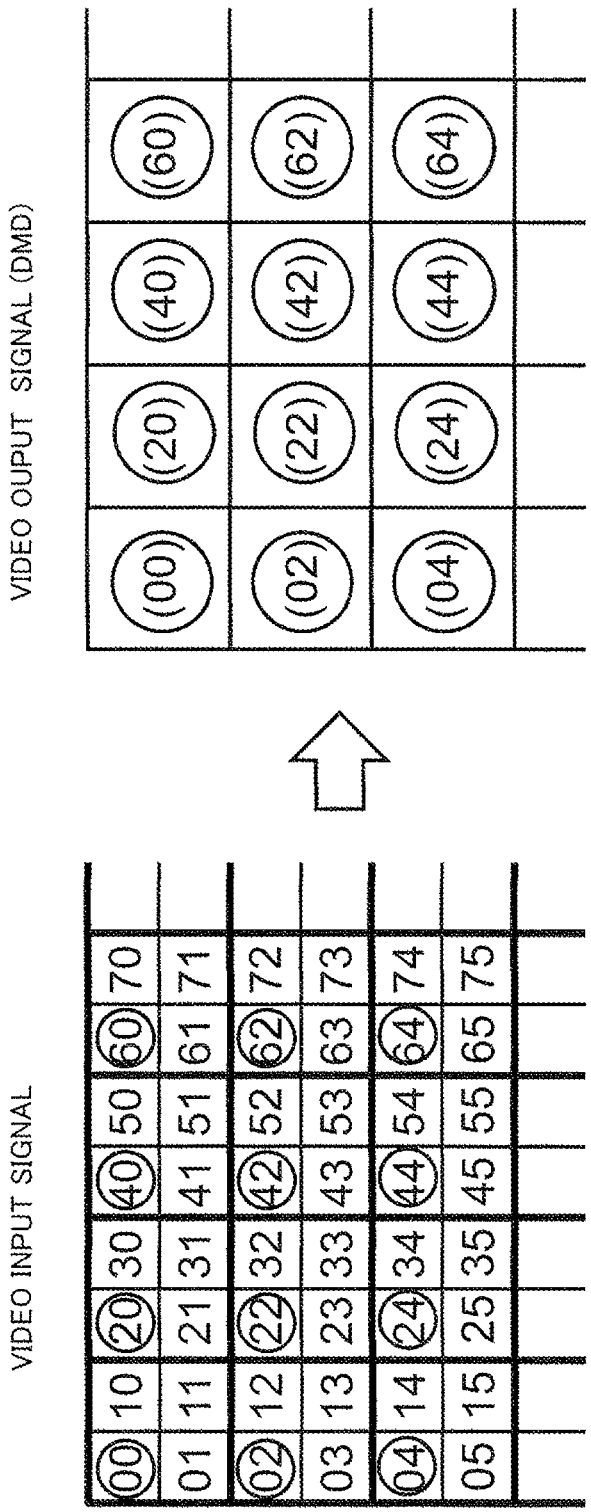
FIG. 7 is a diagram illustrating a correspondence between pixels of a video input signal and pixels of a video output signal in a case where resolution of the video input signal is four times as high as that of the display elements.

In contrast, when inputting the video input signal with resolution four times as high as that of the DMDs 34, 36, and 38, the video signal generation unit 74 generates the video output signal as below. The video signal generation unit 74 defines a plurality of regions each having 2×2 pixels (hereinafter, referred to as "block") in the whole region of a single frame of the image. As illustrated in FIG. 7, the video signal generation unit 74 outputs, for example, a signal of an upper left pixel (a pixel marked with a circle) sampled from four pixels of each block as the video output signal to the display element driver 76. Alternatively, the video signal generation unit 74 may acquire a signal of interpolating pixel by calculating an average value of four pixels of each block and output the signal as the video output signal for each pixel of the DMDs 34, 36, and 38.

2.1.2 Operation in High-Resolution Mode

In the high-resolution mode, the controller 70 drives the optical path changing unit 80 to display an image having high resolution twice the resolution of the DMDs 34, 36, and 38. The video signal generation unit 74 divides, for each pixel (spatially), a single frame (for example, the Nth frame) of the video input signal to generate two types of sub-frames which having different pixel positions. The two types of sub-frames are output sequentially within one frame period. Specifically, as illustrated in FIGS. 8A to 8C, the video signal generation unit 74 outputs, for example, a signal of an upper left pixel (a pixel marked with a circle) in a signal of four pixels of a block containing 2×2 pixels as the video signal for "a first sub-frame", and a signal of a lower right pixel (a pixel marked with a triangle) as the video output signal for "a second sub-frame", to the display element driver 76 in this order. Meanwhile, the piezoelectric element driver 72 outputs the synchronizing signal to synchronize a timing of the transition between the first sub-frame and the second sub-frame in the DMDs 34, 36, and 38 with a timing of shifting the display position of the image light on the screen 200 (changing of the optical path of the image light) by the optical path changing unit 80.

As illustrated in FIGS. 9A to 9B, while the first sub-frame of the video is displayed by the DMDs 34, 36, and 38, the optical path changing unit 80 projects the image light onto a position indicated by a dashed line on the screen 200. While the second sub-frame of the video is displayed by the DMDs 34, 36, and 38, the optical path changing unit 80 changes the optical path of the image light to project the image light onto a position indicated by a solid line in the screen 200, specifically, a position both vertically and horizontally shifted from the display position of the first sub-frame of the video by ½ pixel. In that manner, the projection display apparatus 100 can display an image which keeps or maintains the pixel positions of the second sub-frame of the video signal consistent with the pixel positions of the original video input signal while presenting an image with pseudo high resolution twice as high as that of the DMDs 34, 36, and 38.

Now, control in transition of the Nth frame of the video to the N+1th frame of the video will be described (N is a natural number). The video signal generation unit 74 controls the optical path changing unit 80 to keep the display position of the image light on the screen 200 at the same position before and after the transition from the Nth frame to the N+1th frame as illustrated in FIG. 10A.

Specifically, the video signal generation unit 74 generates the video output signal with the first sub-frame including a signal of an upper left pixel in a signal of four pixels of a block containing 2×2 pixels of the video input signal of the N+1th frame, and the second sub-frame including a signal of a lower right pixel. The video signal generation unit 74 outputs the generated second sub-frame and first sub-frame to the display element driver 76 in this order. Meanwhile, the video signal generation unit 74 generates the synchronizing signal to synchronize a timing of the transition from the second sub-frame to the first sub-frame in the display on the DMDs 34, 36, and 38 with a timing of shifting of the display position on the screen 200 by the optical path changing unit 80, and outputs the synchronizing signal to the piezoelectric element driver 72.

That is, the video signal generation unit 74 controls the order of the sub-frame to display the second sub-frame of the N+1th frame after the second sub-frame of the Nth frame on the DMDs 34, 36, and 38. In other words, the video signal generation unit 74 controls the order of the sub-frame to display the same type of the sub-frame just before and just after the transition of the frame so as not to change the display position on the screen 200. For example, when the first (or second) sub-frame is displayed just before the transition of the frame, the first (or second) sub-frame is displayed also just after the transition of the frame. In other words, the video signal generation unit 74 controls not to drive the piezoelectric element 84 at the transition of the frame.

FIG. 10B is a diagram illustrating a change in voltage applied to the piezoelectric element 84 in the case where the piezoelectric element 84 is driven each time of the transition between the first sub-frame and the second sub-frame. In FIG. 10B, the video is displayed in the order of the first sub-frame (the Nth frame)→the second sub-frame (the Nth frame)→the first sub-frame (the N+1th frame)→the second sub-frame (the N+1th frame).

With the method of driving the piezoelectric element according to the first embodiment as illustrated in FIG. 10A, the driving frequency of the piezoelectric element 84 can be reduced to half of the case where the piezoelectric element 84 is driven each time of the transition between the first sub-frame and the second sub-frame as illustrated in FIG. 10B. Accordingly, a noise caused by the driving operation of the piezoelectric element can be reduced and the video quality can be maintained, and further improvement of reliability of the piezoelectric element can be expected. A high-speed driving operation of the piezoelectric element may produce a driving sound which is sensed as a noise by a user. In the presence of the problem, the method of driving the piezoelectric element according to the first embodiment can suppress the occurrence of the noise.

3. Effects and the Like

As described above, the projection display apparatus 100 has the image generation unit 20 which generates an image light, the optical systems 50 and 60 which project the image light onto the projection plane 200, the optical path changing unit 80 which is provided in the optical path of the image light and changes the display position of the image light on the projection plane 200, and the controller 70 which controls the image generation unit 20 and the optical path changing unit 80 based on the video input signal. The controller 70 generates signals for plural types of sub-frames by dividing spatially a signal for each frame of the video input signal. The controller 70 controls the optical path changing unit 80 to keep the display position of the image light on the projection plane 200 at the same position before and after the transition of the frame of the video signal (i.e., to make the display position before the transition of the frame of the image light on the projection plane 200 equal to the display position after the transition of the frame). Further, the controller 70 controls the image generation unit 20 to make a type (the first/the second sub-frame) of the beginning sub-frame of the frame output just after the transition of the frame equal to the type of the last sub-frame of the frame output just before the transition of the frame.

With the above described configuration, the projection display apparatus 100 can reduce the frequency of changing the optical path of the image light, keep the video quality. Further, it can be expected to improve reliability of the piezoelectric element and reduce a noise.

Second Embodiment

Another example of the projection display apparatus will be described. The projection display apparatus according to the second embodiment has basically the same configuration as that of the projection display apparatus according to the first embodiment except for the configuration of the optical path changing unit. According to the second embodiment, in the high-resolution mode, the projection display apparatus sequentially displays first to fourth sub-frames in a time-division manner while shifting the display positions of the image light on the projection plane in the X direction and/or the Y direction by ½ pixel respectively.

Figure 11:
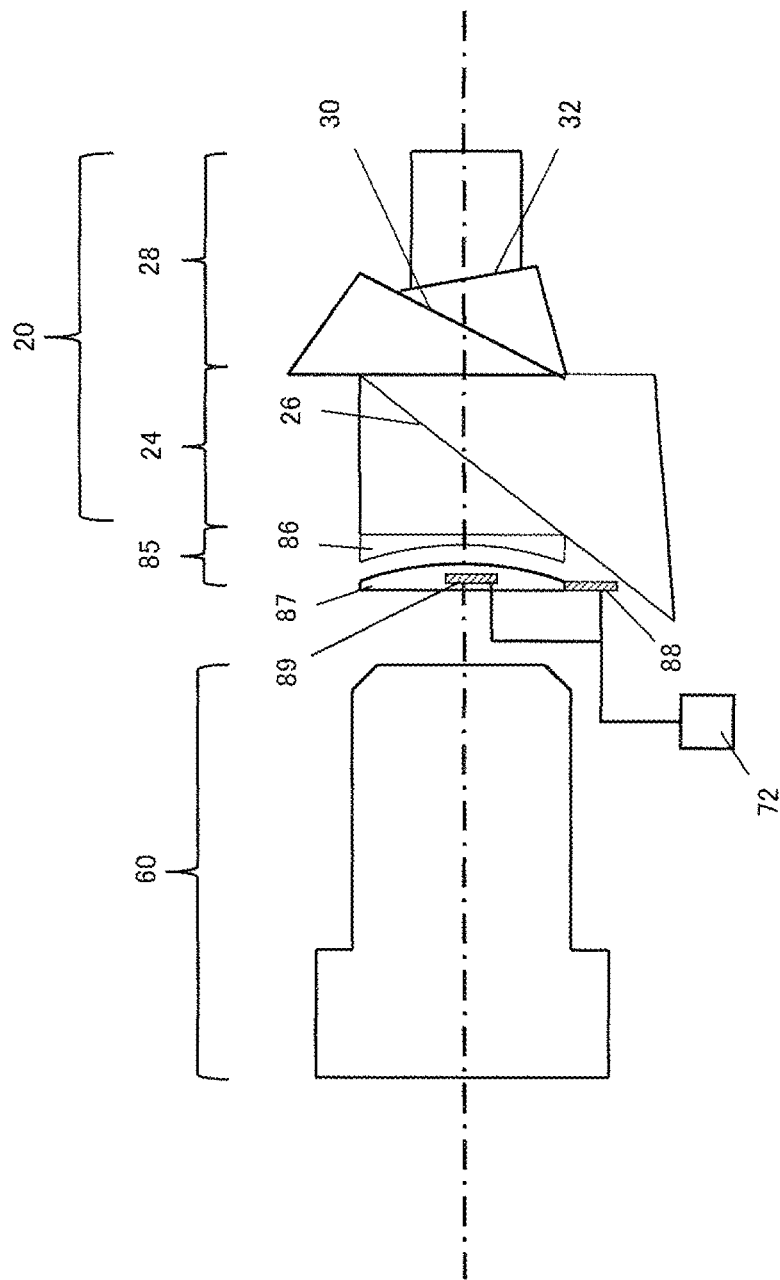
FIG. 11 is a diagram illustrating an optical configuration from an image generation unit to a projection optical system inclusive of a projection display apparatus according to a second embodiment.

A configuration of the optical path changing unit 80 of the projection display apparatus according to the second embodiment will be described with reference to FIG. 11. FIG. 11 is a schematic diagram illustrating an optical configuration from the image generation unit 20 to the projection optical system 60 inclusive of the projection display apparatus according to the second embodiment.

The optical path changing unit 80 has a lens unit 85 which includes two lenses 86 and 87 and is formed to cancel out their refractive indices each other, and the piezoelectric elements 88 and 89 which move one lens of the lens unit 85 into two directions on a plane perpendicular to the optical axis of the projection optical system 60. The piezoelectric elements 88 and 89 are connected with a piezoelectric element driver 72 which controls the piezoelectric elements 88 and 89 to expand or contract by supplying power to the piezoelectric elements 88 and 89. The lens unit 85 may contain three or more lenses.

The lens 86 of the lens unit 85 is a plano-concave lens which has a flat surface on the side of the total reflection prism 24 and is formed as a concave lens on the side of the lens 87. The flat surface of the lens 86 is tightly fixed to the total reflection prism 24. The lens 87 of the lens unit 85 is a plano-convex lens which is formed as a convex lens on the side of the lens 86 and has a flat surface on the side of the projection optical system 60. The lens 87 is arranged between the projection optical system 60 and the lens 86 with a predetermined space.

The piezoelectric elements 88 and 89 of the lens unit 85 are connected to the piezoelectric element driver 72 and move the lens 87 at least into two directions in a plane perpendicular to an optical axis of the projection optical system 60 according to a driving signal (applied voltage) from the piezoelectric element driver 72.

Figure 12:
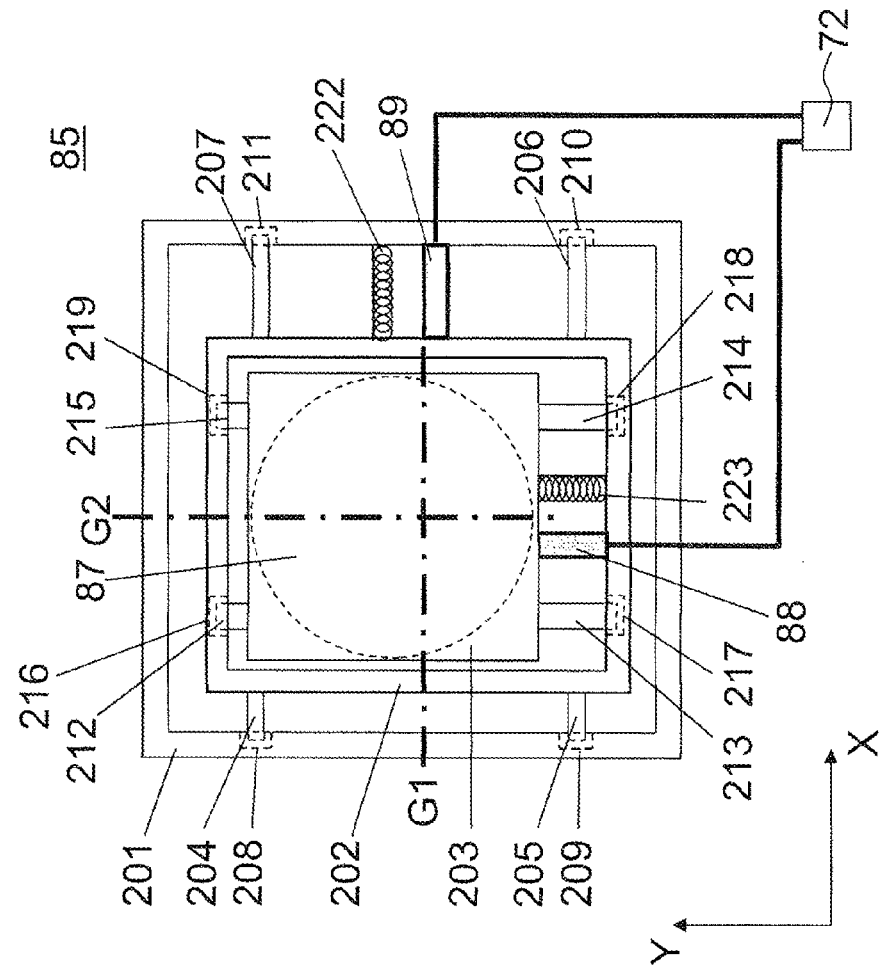
FIG. 12 is a diagram illustrating an example of lens unit of an optical path changing unit according to the second embodiment.

FIG. 12 is a schematic diagram for illustrating an example of a configuration of the lens unit 85. As illustrated in FIG. 12, the piezoelectric elements 88 and 89 of the lens unit 85 have a lens outer frame 201, a lens inner frame 202, and a lens fixing member 203 made of a glass substrate.

The lens inner frame 202 is provided with a support 204, a support 205, a support 206, and a support 207. The lens outer frame 201 is provided with a hole 208, a hole 209, a hole 210, and a hole 211. The support 204 is inserted in the hole 208, the support 205 is inserted in the hole 209, the support 206 is inserted in the hole 210, and the support 207 is inserted in the hole 211. A cross section of each hole is bigger than a cross section of each support. Accordingly, the lens inner frame 202 is movably held by the lens outer frame 201.

The lens fixing member 203 is provided with a support 212, a support 213, a support 214, and a support 215. The lens inner frame 202 is provided with a hole 216, a hole 217, a hole 218, and a hole 219. The support 212 is inserted in the hole 216, the support 213 is inserted in the hole 217, the support 214 is inserted in the hole 218, and the support 215 is inserted in the hole 219. A cross section of each hole is bigger than a cross section of each support. Accordingly, the lens fixing member 203 is movably held by the lens inner frame 202.

The piezoelectric elements 88 and 89 change in length in response to application of a voltage, specifically, expands when a voltage is applied to them and contracts when the voltage application is stopped. The piezoelectric element 89 is fixed to the lens outer frame 201 and contacts the lens inner frame 202. The piezoelectric element 88 is fixed to the lens inner frame 202 and contacts the lens fixing member 203. The piezoelectric elements 88 and 89 are connected to the piezoelectric element driver 72 which supplies individual drive signals (voltage) to the piezoelectric elements 88 and 89. When supplied with the drive signals are supplied from the piezoelectric element driver 72, the piezoelectric elements 88 and 89 expand.

A spring 222 is arranged near the piezoelectric element 89 with both ends of the spring 222 fixed to the lens outer frame 201 and the lens inner frame 202 respectively. The spring 222 applies a tensile force to the lens outer frame 201 and the lens inner frame 202 to pull them to resist the force of the piezoelectric element 89 applied in the direction that the piezoelectric element 89 expands. When the piezoelectric element 89 expands to push the lens inner frame 202, the lens inner frame 202 is moved in the minus direction of X axis with respect to the lens outer frame 201. When the piezoelectric element 89 contracts to pull the lens inner frame 202, the lens inner frame 202 is moved in the plus direction of X axis with respect to the lens outer frame 201.

A spring 223 is arranged near the piezoelectric element 88 with both ends of the spring 223 fixed to the lens inner frame 202 and the lens fixing member 203 respectively. The spring 223 applies a tensile force to the lens fixing member 203 and the lens inner frame 202 to pull them to resist the force of the piezoelectric element 88 applied in the direction that the piezoelectric element 88 expands. When the piezoelectric element 88 expands to push the lens fixing member 203, the lens 87 is moved together with the lens fixing member 203 in the plus direction of Y axis with respect to the lens inner frame 202. When the piezoelectric element 88 contracts and the spring 223 pulls the lens fixing member 203, the lens 87 is moved together with the lens fixing member 203 in the minus direction of Y axis with respect to the lens inner frame 202.

The piezoelectric element 89 and the spring 222 are arranged near the center of gravity G1 in the direction of Y axis of a lens part which includes the lens 87, and the lens inner frame 202 and the lens fixing member 203 as a holding unit for holding the lens 87. The piezoelectric element 88 and the spring 223 are arranged near the center of gravity G2 in the direction of X axis of the lens part.

With the above described configuration of the optical path changing unit 80, the projection display apparatus according to the second embodiment can display an image with resolution four times as high as that of the DMDs 34, 36, and 38 in the high-resolution mode. Control for achieving the four-time resolution will be described below with reference to FIGS. 13 and 14.

The video signal generation unit 74 divides a single frame (for example, the Nth frame) of the video input signal for each pixel (specially) to generate four types of sub-frames having different pixels positions, in order to display an image with resolution four times as high as that of the DMDs 34, 36, and 38. Four type of sub-frames are output sequentially in one frame period. Specifically, as illustrated in FIGS. 13A to 13E, the video signal generation unit 74 outputs, for example, a signal of an upper left pixel in a signal of pixels in a block containing 2×2=4 pixels as the video signal for a first sub-frame (see FIG. 13B), a signal of an upper right pixel as the video signal for a second sub-frame (see FIG. 13C), a signal of a lower right pixel as the video signal for a third sub-frame (see FIG. 13D), and a signal of a lower left pixel as the video output signal for a fourth sub-frame (see FIG. 13E) to the display element driver 76 in this order. Meanwhile, the video signal generation unit 74 outputs a synchronizing signal to synchronize a timing of the transition of the respective sub-frames with a timing of shifting of the display position of the image light on the screen 200 (changing of the optical path of the image light) by the optical path changing unit 80 to the piezoelectric element driver 72.

While the first sub-frame of the video is displayed on the DMDs 34, 36, and 38 (see FIG. 14A1), the optical path changing unit 80 projects the image light onto a predetermined position (reference position) on the screen 200 (see FIG. 14A2). Next, while the second sub-frame of the video is displayed on the DMDs 34, 36, and 38 (see FIG. 14B1), the optical path changing unit 80 changes the optical path to project the image light on a position indicated by a solid line which is shifted leftward by ½ pixel from the reference position indicated by a dashed line (see FIG. 14B2). Specifically, the piezoelectric element 89 expands to cause the lens unit 85 to change the optical path of the image light.

While the third sub-frame of the video is displayed on the DMDs 34, 36, and 38 (see FIG. 14C1), the optical path changing unit 80 changes the optical path to project the image light on a position indicated by a solid line which is further shifted downward by ½ pixel, i.e., which is both vertically and horizontally away from the reference position by ½ pixel (see FIG. 14C2). Finally, while the fourth sub-frame of the video is displayed on the DMDs 34, 36, and 38 (see FIG. 14D1), the optical path changing unit 80 changes the optical path to project the image light on a position indicated by a solid line which is shifted rightward by ½ pixel, i.e., which is shifted downward from the reference position by ½ pixel (see FIG. 14D2). In that manner, it is possible to obtain consistency between the pixel position of each sub-frame and those of the original video input signal image and to present an image with higher resolution four times as high as that of the DMDs 34, 36, and 38.

Next, control in the transition from the Nth frame of the video to the N+1th frame of the video will be described. FIGS. 15A to 15C illustrate driving voltage waveforms of the piezoelectric elements 88 and 89 according to the second embodiment. FIG. 15A illustrates a change in the driving voltage for the piezoelectric element 89 to move the lens 87 in the X direction. FIG. 15B illustrates a change in the driving voltage for the piezoelectric element 88 to move the lens 87 in the Y direction. FIG. 15C illustrates shifted projection positions of images on the screen. As in the first embodiment, the projection display apparatus according to the second embodiment controls the changeover of the sub-frames so that the types of the sub-frames displayed before and after the transition of the frame are the same. For example, when the first (or fourth) sub-frame is displayed just before the transition of the frame, the first (or fourth) sub-frame is also displayed just after the transition of the frame. The video signal generation unit 74 controls the optical path changing unit 80 to keep the display position of the image light on the screen 200 at the same position before and after the transition from the Nth frame to the N+1th frame, as illustrated in FIGS. 15A to 15C.

Specifically, the video signal generation unit 74 generates a signal of an upper left pixel, in a signal of pixels in a block containing 2×2 pixels of the video input signal of the N+1th frame, as "the first sub-frame", a signal of an upper right pixel as "the second sub-frame", a signal of a lower right pixel as "the third sub-frame", and a signal of a lower left pixel as "the fourth sub-frame" in the same manner as for the Nth frame. Then, the video signal generation unit 74 outputs the video output signals to the display element driver 76 in order of the fourth sub-frame, the third sub-frame, the second sub-frame, and the first sub-frame. Meanwhile, the video signal generation unit 74 outputs the synchronizing signal to synchronize a timing of the transition of the respective sub-frames on the DMDs 34, 36, and 38 with a timing of shifting of the display position on the screen 200 by the optical path changing unit 80, to the piezoelectric element driver 72.

That is, the video signal generation unit 74 controls the order of the sub-frame to display the fourth sub-frame of the N+1th frame after the fourth sub-frame of the Nth frame (1→2→3→4→4→3→2→1→1→2) on the DMDs 34, 36, and 38.

FIGS. 16A to 16C are diagrams illustrating driving voltages of the piezoelectric elements 88 and 89 in the case where the image is displayed by switching the sub-frames in the order 1→2→3→4→1→2→3→4→1→2. FIG. 16A illustrates a change in the driving voltage for the piezoelectric element 89 for moving the lens 87 in the X direction. FIG. 16B illustrates a change in the driving voltage for the piezoelectric element 88 for moving the lens 87 in the Y direction. FIG. 16C illustrates shifted projection positions of images on the screen.

In the second embodiment, by switching the sub-frames as illustrated in FIGS. 15A to 15C, the driving frequency of the piezoelectric element 88 can be reduced to half of the case where the sub-frames to be displayed are switched as illustrated in FIGS. 16A to 16C (see FIG. 15B, FIG. 16B). Therefore, according to the second embodiment, it is possible to maintain the video quality and expect effects of improving reliability of the piezoelectric element and reducing a noise.

Third Embodiment

In the third embodiment, a configuration which applies the idea of the first embodiment to displaying of a stereoscopic image will be described. Configuration and operation of the projection display apparatus according to the third embodiment are basically the same as those described in the first embodiment. The projection display apparatus according to the third embodiment will be described below by focusing on difference from the first embodiment.

In the third embodiment, an order of outputting four sub-frames corresponding to display positions of a left eye image and a right eye image is switched. The projection display apparatus according to the third embodiment controls the optical path changing unit 80 and the timing of opening/closing liquid crystal shutters of liquid crystal shutter glasses put on the user for viewing a stereoscopic image to reduce driving frequencies of the piezoelectric element of the optical path changing unit 80 and the liquid crystal shutters of the liquid crystal shutter glasses 301 As a result, the projection display apparatus can suppress degradation of luminance due to stereoscopic display.

Figure 17:
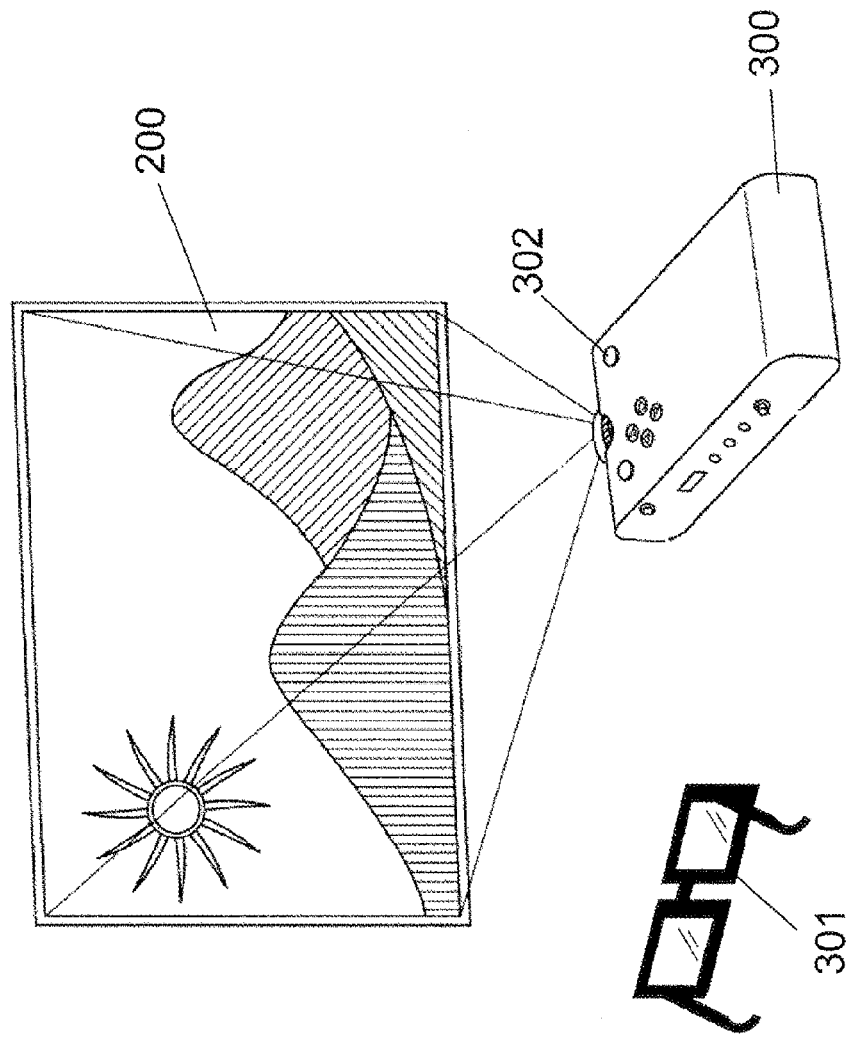
FIG. 17 is an external perspective view of a projection display apparatus which can display a stereoscopic video according to a third embodiment.

A configuration of the projection display apparatus according to the third embodiment which can display a stereoscopic image will be described with reference to FIG. 17. FIG. 17 is an external perspective view of a projection display apparatus 300 which can display stereoscopic image. The projection display apparatus 300 according to the third embodiment generates a left eye image and a right eye image based on a video input signal by the controller 70. As illustrated in FIG. 17, the projection display apparatus 300 projects image lights for displaying the left eye image and the right eye image generated based on the video input signal alternately onto the screen 200. The projection display apparatus 300 has an emitter 302 for outputting a control signal which controls opening/closing of the liquid crystal shutter glasses 301 in synchronization with the image to display. The liquid crystal shutter glasses 301 have a light receiving unit (not shown) for receiving the control signal from the emitter 302. According to the control signal, the liquid crystal shutter glasses 301 control either one of the liquid crystal shutter for left eye and the liquid crystal shutter for right eye to close in synchronization with the image displayed by the projection display apparatus 300.

Now, an image outputting operation of the projection display apparatus 300 will be described. FIG. 18A is a diagram illustrating a change in the driving voltage for the piezoelectric element 84. FIG. 18B is a diagram illustrating a change of a switching signal for the liquid crystal shutters of the liquid crystal shutter glasses 301 ("High" opens the shutter for left eye and closes the shutter for right eye, and "Low" closes the shutter for left eye and opens the shutter for right eye). FIG. 18C is a diagram illustrating the types of displayed sub-frames and the shifted projection positions of images on the screen.

In the third embodiment, the projection display apparatus 300 is adapted to display the image of the same type (left eye image/right eye image and sub-frames) before and after the transition of the frame. For example, when the left eye image of a first sub-frame is displayed immediately before the transition of the frame, the left eye image of the first sub-frame is displayed also immediately after the transition of the frame. Alternatively, when the right eye image of a second sub-frame is displayed immediately before the transition of the frame, the right eye image of the second sub-frame is displayed also immediately after the transition of the frame.

That is, as illustrated in FIG. 18C, the projection display apparatus 300 displays the images in the order of the first sub-frame for left eye (L1) of the Nth frame→the second sub-frame for left eye (L2)→the second sub-frame for right eye (R2)→the first sub-frame for right eye (R1)→the first sub-frame for right eye (R1) of the N+1th frame→the second sub-frame for right eye (R2)→the second sub-frame for left eye (L2)→the first sub-frame for left eye (L1), . . .

. Thus, the projection display apparatus 300 outputs the sub-frames four times as fast (for example, 240 Hz) as a normal frame-rate (for example, 60 Hz).

FIG. 19A is a diagram illustrating a driving voltage for the piezoelectric element 84, FIG. 19B is a diagram illustrating a switching signal for liquid crystal shutters, and FIG. 19C is a diagram illustrating the types and the projection positions of the sub-frames displayed on the screen, in a case where the projection display apparatus 300 controls the display order to display the first sub-frame at first and then the second sub-frame in each of the left eye image and the right eye image.

The projection display apparatus 300 controls output order of the left eye image and the right eye image and the order of the sub-frames in the orders illustrated in FIGS. 18A to 18C, and thus the driving frequencies of the piezoelectric element 84 and the liquid crystal shutter can be reduced to half of those of the case as illustrated in FIGS. 19A to 19C.

That is, the video signal generation unit 74 outputs the Nth frame in the order of L1→L2→P2→R1 and the N+1th frame in the order of R1→R2→L2→L1. Hence, the display position of the image light on the screen 200 is kept before and after the transition from the second sub-frame to the third sub-frame of the Nth frame and the transition from the Nth frame to the N+1th frame of the image. Therefore, the projection display apparatus 300 can reduce the driving frequency of the piezoelectric element to half of the case where it displays the image light in the order of the left eye image and the right eye image for each frame and in the order of the first sub-frame and the second sub-frame in each of the left eye image and the right eye image.

In the third embodiment, the liquid crystal shutter glasses 301 switch between the left eye and the right eye at the rate (for example, 60 Hz) the same as the normal frame-rate (for example, 60 Hz) in synchronization with the output image. That is, regarding the switching timing, when the image is switched from the second sub-frame to the third sub-frame in the Nth frame, the liquid crystal shutter for left eye closes and the liquid crystal shutter for right eye opens. Then, when the image is switched from the second sub-frame to the third sub-frame in the N+1th frame, the liquid crystal shutter for left eye opens and the liquid crystal shutter for right eye closes.

As described above, in the third embodiment, the controller 70 generates a left eye video signal and a right eye video signal for stereoscopic display from the video input signal. The controller 70 controls the image generation unit 20 to generate the image light for left eye in the beginning sub-frame of the frame output just after the transition of frame, when the image light of the last sub-frame of the frame output just before the transition is the video for left eye. Also, the controller 70 controls the image generation unit 20 to generate the image light for right eye in the beginning sub-frame of the frame output just after the transition, when the image light of the last sub-frame of the frame output just before the transition is the video for right eye.

According to the third embodiment, the projection display apparatus 300 can provide the user with the same experience as in the normal operation illustrated in FIGS. 19A to 19C while achieving the half driving frequencies of the piezoelectric element and the liquid crystal shutter. As a result, a period available for displaying the video can be longer, and thus degradation of luminance due to stereoscopic display can be suppressed.

Other Embodiments

Although the light source unit 10 has not been specifically defined in the above described embodiments, a lamp light source and a solid state light source, particularly, a light source having a combination of a laser light source and a fluorescent material can be used. Although a configuration of the image generation unit 20 having three DMDs has been described above, the image generation unit is not limited to that. The image generation unit may be adapted to contain only a single DMD. Alternatively, a transmissive liquid crystal display element and reflective liquid crystal display element may be used as the display element in place of the DMD.

Although a piezoelectric element has been described as a driving element for vibrating the optical path changing unit 80 in the above embodiments, the driving element is not limited to that and a voice coil motor and the like may also be used. Although the optical path changing unit 80 has been arranged between the image generation unit 20 and the projection optical system 60, the optical path changing unit 80 only needs to be arranged somewhere between the image generation unit 20 and the screen 200. For example, it may be interposed between the lenses of the projection optical system 60. Although a configuration of the lens unit 85 has been described to have the plano-concave lens 86 and the plano-convex lens 87 arranged in this order with respect to the image generation unit 20, the configuration is not limited to that. The lens unit 85 only needs to have two lenses which cancel out their refractive indices each other. Therefore, in the lens unit 85, the plano-convex lens 87 and the plano-concave lens 86 may be arranged in this order with respect to the image generation unit 20.

Although the first embodiment has been described as an example of using a signal of an upper left pixel as the first sub-frame and a signal of a lower right pixel as the second sub-frame to achieve the double resolution video display in the high-resolution mode, the sub-frames are not limited to that. For example, a signal of an upper right pixel may be used as the first sub-frame and a signal of a lower left pixel may be used as the second sub-frame. In that case, the optical path changing unit controls the optical path of the image light to move the display position of the image light on the projection plane between the upper right and the lower left according to the position of the sampled pixel.

Although a signal of the upper left pixel of a block has been used as the first sub-frame in generation of the video signals of the sub-frames by the video signal generation unit in the above described embodiments, the first sub-frame is not limited to that. A signal of a pixel in another position may be set as the first sub-frame. Alternatively, an interpolation signal between pixels may be generated to be set as the first sub-frame.

Figure 20:
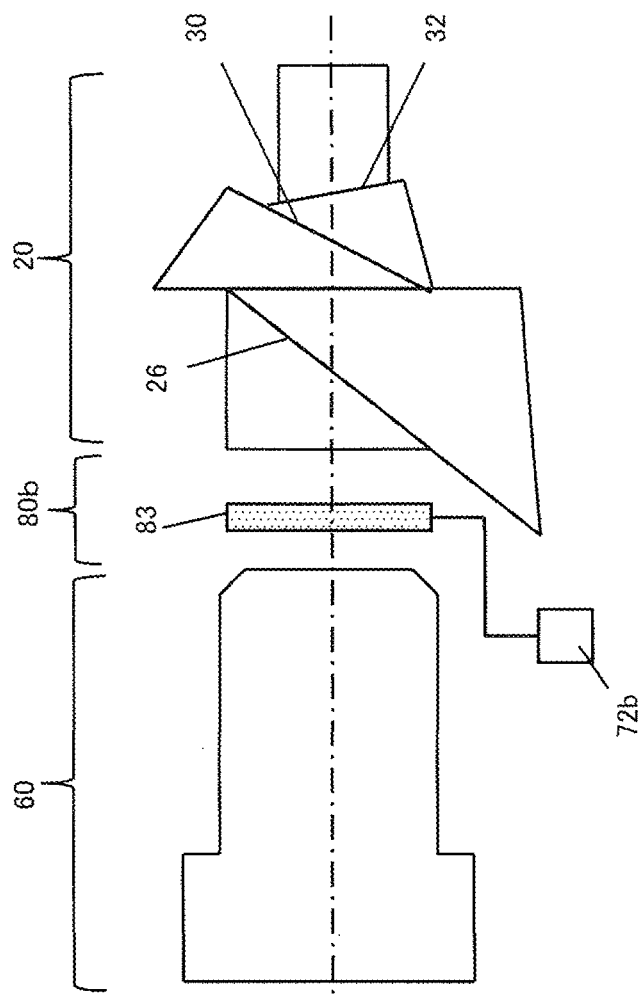
FIG. 20 is a diagram for illustrating a configuration of an optical path changing unit which is provided with a liquid crystal display element.

Although a glass member or a lens has been used as an optical path changing member of the optical path changing unit in the above described embodiments, a liquid crystal display element may be used as the optical path changing member. That is, the optical path changing unit may shift the optical path by changing the refractive index of the liquid crystal display element. FIG. 20 illustrates a configuration of an optical path changing unit which uses a liquid crystal display element. The optical path changing unit 80*b* includes a liquid crystal display element 83 and a driving circuit 72*b* for driving the liquid crystal display element 83. The driving circuit 72*b* controls the voltage applied to the liquid crystal display element 83 to change the refractive index of the liquid crystal display element, thereby shifting the optical path of the light transmitted through the liquid crystal display element 83 in a predetermined direction. Such an optical path changing unit with the above described configuration can also shift the optical path. The concept of the switch control of the driving voltage and the sub-frames as illustrated in FIG. 10A can be also applied to the driving control on the optical path changing unit 80b.

Figure 21:
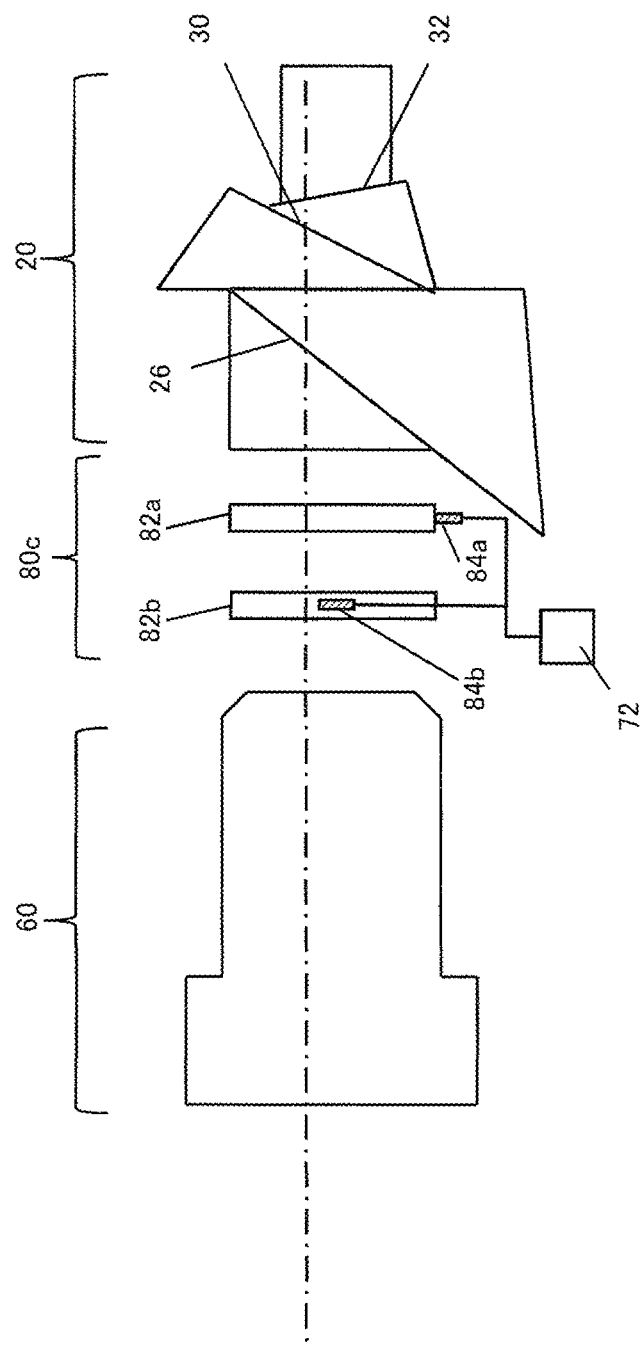
FIG. 21 is a diagram for illustrating a configuration of an optical path changing unit which is provided with two glass members and can shift an optical path of an image light in biaxial directions.

Although a configuration of changing the optical path by shifting the lens 87 in two directions (in the X direction and the Y direction) as illustrated in FIGS. 11 and 12 has been described in the second embodiment, the configuration of the optical path changing unit is not limited to that. For example, the optical path changing unit capable of shifting the optical path in two directions with combination of two glass members as described in the first embodiment may be used. FIG. 21 illustrates such a configuration of the optical path changing unit. An optical path changing unit 80c includes glass members 82a and 82b for refracting the optical path of the image light from the image generation unit 20 by making use of changes in the refractive indices and piezoelectric elements 84a and 84b for changing the angles of the glass members 82a and 82b. The glass member 82a shifts the projection position of the pixel in the Y direction, and the glass member 82b shifts the projection position of the pixel in the X direction. The piezoelectric elements 84a and 84b are driven by the piezoelectric element driver 72. The combination of the two glass members 82a and 82b allows the optical path to be shifted in the X direction and the Y direction.

Figure 22:
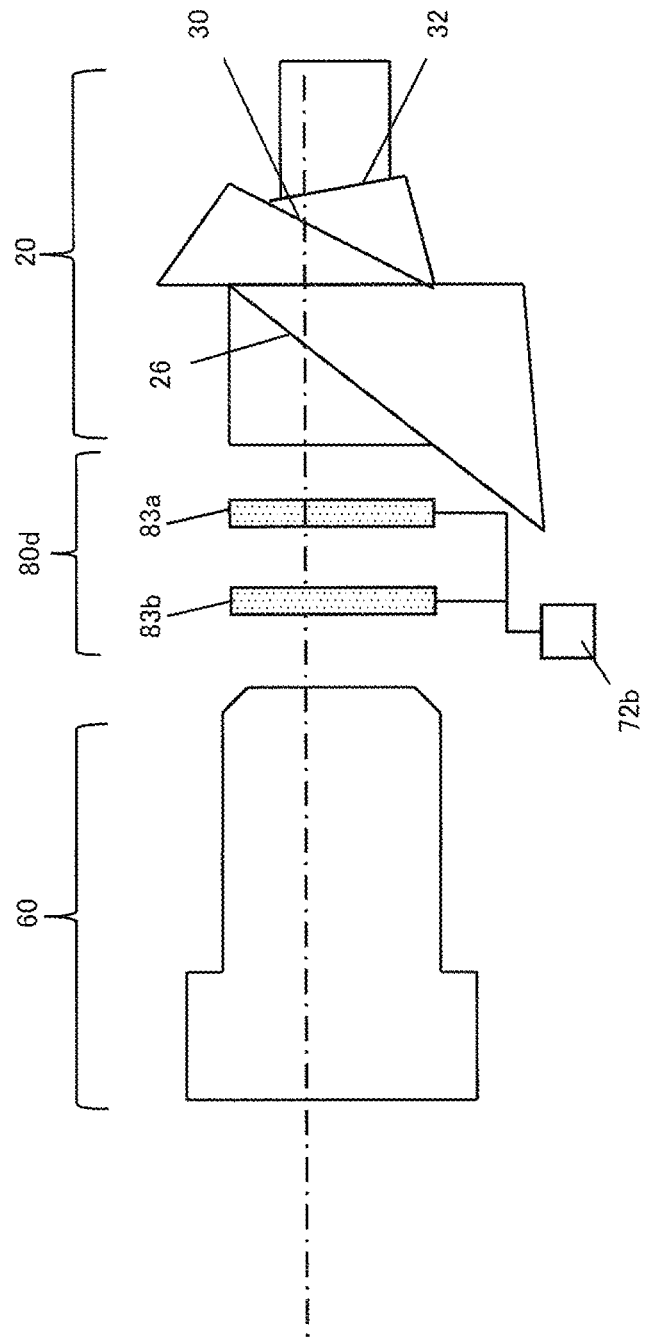
FIG. 22 is a diagram for illustrating a configuration of an optical path changing unit which is provided with two liquid crystal display elements and can shift the optical path of the image light in biaxial directions.

Alternatively, the optical path of the image light may be shifted in two directions by using two liquid crystal display elements. FIG. 22 illustrates a configuration of an optical path changing unit which uses two liquid crystal display elements to shift the optical path in two directions. An optical path changing unit 80d includes a liquid crystal display element 83a for shifting the optical path in the Y direction, a liquid crystal display element 83b for shifting the optical path in the X direction, and a driving circuit 72b for driving the liquid crystal display units 83a and 83b. The concept of the switch control of the driving voltage and the sub-frames as illustrated in FIGS. 15A to 15C can be applied to the driving control on the optical path changing units 80c and 80d.

Although the liquid crystal shutter glasses 301 has been described in the third embodiment, the technology to achieve stereoscopic display is not limited to that and other field sequential 3D systems may be used. For example, also a system using polarized glasses can be used and reduce the driving frequency of a device which modulates the polarization direction of the projected image light to half. A wavelength division system can be used and reduce the switching frequency of multilayer filter to half.

The above described embodiments and other embodiments which can be considered as best modes have been provided by the attached drawings and the detailed description. The attached drawings and the detailed description have been provided to exemplify the subject matter described in the claims with reference to specific embodiments for those skilled in the art. Therefore, various changes, substitutions, additions, omissions and the like may be performed on the above described embodiments within the scope of the claims and the equivalent of the claims.

INDUSTRIAL APPLICABILITY

The disclosure can be applied to a projection display apparatus such as a projector.

What is claimed is:

1. A projection display apparatus comprising:
an image generation unit that generates an image light;
an optical system that projects the image light onto a projection plane;
an optical path changing unit that is provided on an optical path of the image light and changes a display position of the image light on the projection plane; and
a controller that controls the image generation unit and the optical path changing unit based on a video input signal, wherein
the controller generates signals for plural types of sub-frames by dividing spatially a signal for each frame of the video input signal, and
the controller controls the optical path changing unit to keep the display position of the image light on the projection plane for a first sub-frame in a frame output just after a transition at a same position as a display position for a last sub-frame in a frame output just before the transition, and further
controls the image generation unit to select a predetermined type of sub-frame from plural types of sub-frames and output the selected sub-frame according to the control of the optical path changing unit.

2. The projection display apparatus according to claim 1 wherein,
the optical path changing unit comprises a first optical path changing member capable of shifting the optical path of the image light in a first direction, and a second optical path changing member capable of shifting the optical path of the image light in a second direction different from the first direction, and
the controller controls the optical path changing unit to keep a shift position of the image light in the first direction shifted by the first optical path changing member and a shift position of the image light in the second direction shifted by the second optical path changing member, before and after the transition of the frame.

3. The projection display apparatus according to claim 1, wherein
the controller generates a left eye image signal and a right eye image signal for stereoscopic display from the video input signal, and
the controller controls the image generation unit
to generate an image light for a left eye image in the beginning sub-frame of the frame output just after the transition of the frame, when the image light of the last sub-frame of the frame output just before the transition of the frame is of the left eye image, and
to generate an image light for a right eye image in the beginning sub-frame of the frame output just after the transition of the frame, when the image light of the last sub-frame of the frame output just before the transition of the frame is of the right eye image.

4. The projection display apparatus according to claim 1, wherein the controller generates a video signal for the sub-frame by sampling predetermined pixels in each of plural blocks into which a region of image of a single frame of the video input signal is divided.

5. The projection display apparatus according to claim 1, wherein the optical path changing unit includes either one of a glass member, a liquid crystal display element, and a lens.

6. The projection display apparatus according to claim 1, wherein the image generation unit includes either one of a DMD (Digital Mirror Device) and a liquid crystal display element.

7. The projection display apparatus according to claim 1, wherein an output order of a sub-frame in a frame before the transition is opposite to an output order of a sub-frame in a frame after the transition.

* * * * *